(12) United States Patent
Else et al.

(10) Patent No.: US 10,949,254 B2
(45) Date of Patent: *Mar. 16, 2021

(54) SYSTEMS AND METHODS FOR SCHEDULING TASKS

(71) Applicants: ATLASSIAN PTY LTD, Sydney (AU); ATLASSIAN, INC., San Francisco, CA (US)

(72) Inventors: Alexander Else, Sydney (AU); Haitao Li, Sydney (AU)

(73) Assignees: ATLASSIAN PTY LTD., Sydney (AU); ATLASSIAN INC., San Francisco, CA (US)

(*) Notice: Subject to any disclaimer, the term of this patent is extended or adjusted under 35 U.S.C. 154(b) by 76 days.

This patent is subject to a terminal disclaimer.

(21) Appl. No.: 16/206,854

(22) Filed: Nov. 30, 2018

(65) Prior Publication Data
US 2020/0104165 A1 Apr. 2, 2020

Related U.S. Application Data

(60) Provisional application No. 62/737,941, filed on Sep. 28, 2018.

(51) Int. Cl.
*G06F 9/48* (2006.01)
*G06F 9/50* (2006.01)
*G06F 9/54* (2006.01)

(52) U.S. Cl.
CPC .......... *G06F 9/4881* (2013.01); *G06F 9/4887* (2013.01); *G06F 9/5038* (2013.01); *G06F 9/546* (2013.01); *G06F 2209/483* (2013.01); *G06F 2209/486* (2013.01); *G06F 2209/548* (2013.01)

(58) Field of Classification Search
CPC .... G06F 9/4881; G06F 9/4887; G06F 9/5038; G06F 9/546; G06F 2209/483; G06F 2209/486; G06F 2209/548
See application file for complete search history.

(56) References Cited

U.S. PATENT DOCUMENTS

| | | | |
|---|---|---|---|
| 2009/0043825 A1* | 2/2009 | Bourne | G06F 16/14 |
| 2015/0220370 A1 | 8/2015 | Ujibashi et al. | |
| 2017/0116276 A1* | 4/2017 | Ziauddin | G06F 16/24539 |
| 2017/0161114 A1* | 6/2017 | Benton | G06F 9/4881 |

* cited by examiner

*Primary Examiner* — Jacob D Dascomb
(74) *Attorney, Agent, or Firm* — Brownstein Hyatt Farber Schreck, LLP

(57) ABSTRACT

In one embodiment, a method for scheduling tasks comprises, at a task scheduler of a processing node of a plurality of processing nodes: retrieving a first task descriptor from a local memory of the task scheduler, the task descriptor corresponding to a task scheduled for execution at the current time and comprising at least a task execution time, a frequency for performing the task, and a task identifier; determining whether the task descriptor is assigned to the task scheduler for execution; if it is determined that the task descriptor is assigned to the task scheduler for execution: executing the task; updating the task execution time based on the current task execution time and the frequency for performing the task; and re-queuing the task descriptor in the local memory.

14 Claims, 8 Drawing Sheets

SYSTEMS AND METHODS FOR SCHEDULING TASKS

BENEFIT CLAIM

This application claims the benefit under 35 U.S.C. 119(e) of provisional application 62/737,941, filed Sep. 28, 2018, the entire contents of which are hereby incorporated by reference as if fully set forth herein.

TECHNICAL FIELD

Aspects of the present disclosure are directed to scheduling tasks.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Typically, processors are configured to execute tasks sequentially—i.e., when a task is forwarded to the processor it performs the task. However, when a multitude of tasks are generated in quick progression, i.e., quicker than it takes the processor to execute a particular task, the tasks are queued until the processor completes the previous task. Generally speaking, a task scheduler is employed in these situations to order the queued tasks based on some criteria, such as priority, and forward the tasks in that order to the processor for execution.

When the tasks to be processed cannot be handled by a single processor in an efficient manner, multiple processors can be initiated and executed in parallel to share the tasks. In these cases, the task scheduler in addition to ordering the tasks is also responsible for determining which processor it is supposed to assign the queued tasks to.

Typical scheduling algorithms take into account the number of parallel processors executing, the number of queued tasks, the time required to complete each task and then assign tasks to the processors in such a way that work is balanced across the parallel processors. These scheduling algorithms may function well when the number of parallel processors is constant. However, when the number of processors available to execute tasks changes—for example, the number of available parallel processors increases (to meet increased demand) or reduces (in light of lower demand or because of processor failures), the task scheduler needs to reschedule tasks in real time and this can get complicated.

SUMMARY

The appended claims may serve as a summary of the invention.

Figure 1:
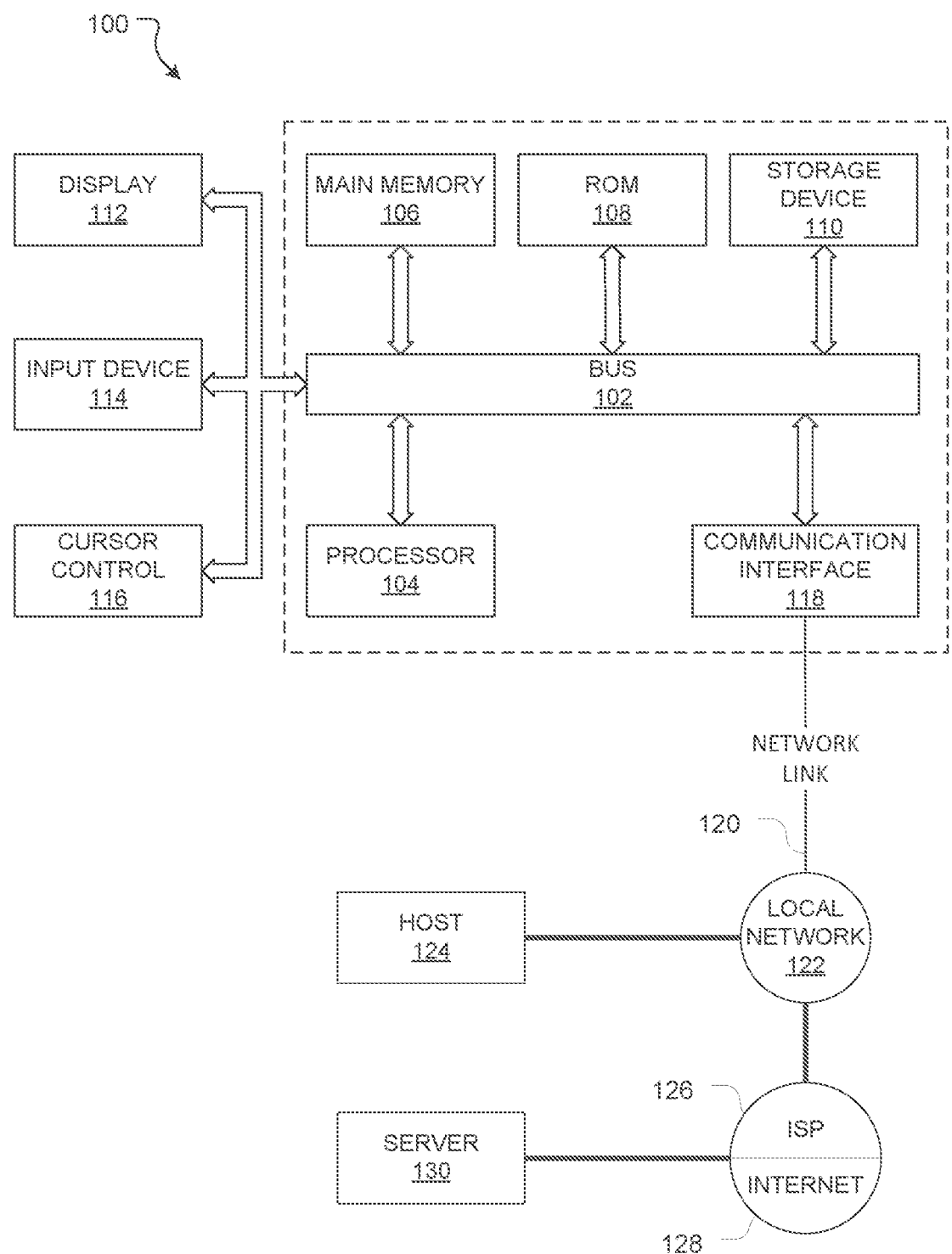
FIG. 1 is a block diagram illustrating a computer system, which may be used to implement various embodiments.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

Overview

In the following description, for the purposes of explanation, numerous specific details are set forth to provide a thorough understanding of the present invention. It will be apparent, however, that the present invention may be practiced without these specific details. In some instances, well-known structures and devices are shown in block diagram form to avoid unnecessary obscuring.

A first aspect of the present disclosure relates to methods and systems for scheduling tasks amongst a plurality of processing nodes. In particular, the disclosed methods and systems are related to a distributed scheduling architecture where each processing node includes its own task scheduler for determining which tasks should be assigned to that particular processing node and for ordering the assigned tasks for execution by that processing node. Further, the task scheduler associated with each individual processing node periodically determines how many other processing nodes are concurrently sharing the tasks and is configured to reassess and/or reassign tasks to its own processing node if the total number of processing nodes changes.

To facilitate this, all incoming tasks may be randomly allocated a number in an arbitrary range (e.g., a number in the range 1-100). Each task scheduler then allocates a particular section of that range to its corresponding processing node. For example, if there are four processing nodes, the task scheduler of the first processing node volunteers to manage all tasks in the range of 1-25, the task scheduler of the second processing node volunteers to manage all tasks in the range of 26-50, the task scheduler associated with the third processing node volunteers to manage all tasks in the range of 51-75 and the task scheduler of the fourth processing node volunteers to manage all tasks in the range of 76-100. Each task scheduler may then instruct its corresponding processing node to execute any tasks that are allocated a number in the assigned range of that processing node as and when required—e.g., in the order in which the tasks were placed in a job queue or in the order of their scheduled execution times.

The task scheduler of each active processing node is also configured to periodically check in with a central database to indicate that it is still active and to retrieve a list of other active processing nodes. Because of this periodic reporting and retrieval each task scheduler is aware of the number of active processing nodes at any given time and can utilize this information to reassign its own tasks. If the number of active processing nodes remains the same, the active task schedulers proceed to perform tasks in their scheduled manner. However, if the task schedulers determine that the number of processing nodes have changed based on the periodically retrieved information, e.g., if the number of processing nodes have reduced or increased, each active task scheduler is configured to recalculate its assigned range. For example, if the number of processing nodes increases to five from four between two checks, each of the four previously active task schedulers may be configured to reduce their own task range (e.g., from 25 to 20) and the newly active task scheduler may be configured to assign tasks associated with the range 80-100 to itself. This way, task schedulers can proactively and automatically readjust their workloads in light of fluctuating demands and/or sudden failures.

A second aspect of the present disclosure relates to methods and systems for scheduling tasks amongst a plurality of processing groups, where each processing group may include one or more processing nodes. In this aspect, similar to the first aspect, each processing node includes its own task scheduler for determining which tasks should be assigned to that particular processing node and for ordering the assigned tasks for execution by that processing node. Further, the task scheduler associated with each individual processing node is configured to periodically determine how many other processing nodes are present in its own processing group and additionally to determine how many other processing groups exist. This information is used to reassess and/or reassign tasks to its own processing node if the number of processing nodes and/or processing groups changes.

Tasks may be divided amongst members of a processing group in a manner similar to that described with respect to the first aspect—i.e., by randomly assigning a number in an arbitrary range (e.g., in the range of 1-100) to incoming tasks and then dividing that arbitrary range amongst the active processing nodes in a particular group. In addition to dividing tasks amongst processing nodes in a particular group, in this aspect, the task schedulers are also configured to divide execution of a task amongst the processing groups based on task requirements. For example, end users may wish to have their tasks executed sequentially by two or more processing groups (in a round-robin fashion), have their task executed simultaneously by two or more processing groups, or have just one processing group responsible for executing their task. The end user can specify their preference when setting up the task and depending on the preference, the task schedulers may be configured to determine whether they are meant to execute a particular task or not.

For example, in case round-robin execution is preferred, the task schedulers may be configured to determine a time cycle for the task, e.g., based on the number of active processing groups and the frequency of executing the task. In case a task is scheduled for execution every 30 seconds and there are three processing groups, the time cycle is determined to be 90 seconds. This time cycle may be divided into time windows amongst the active processing groups (e.g., 30 second time windows) such that at any given time a task is owned by a single processing group that is responsible for executing that task.

In this aspect as well, each task scheduler periodically reports to the central database and retrieves a list of active processing nodes in its own group and a list of active processing groups. Armed with this information each individual task scheduler is then able to recalculate/reassign tasks if the status quo changes between two consecutive periodical retrievals. For example, if the number of processing nodes increases to five from four between two checks, the task scheduler may be configured to reduce its own range (e.g., from 25 to 20). Similarly, if the number of processing groups reduces from three groups to two groups, the individual task schedulers may be configured to reduce the time cycle from 30 seconds to 20 seconds such that each processing group is now responsible for half the time cycle (10 seconds each).

By utilizing distributed scheduling (i.e., including a task scheduler in each processing node instead of maintaining a central task scheduler), the presently disclosed systems and methods can avoid bottlenecks that arise when a single task scheduler is utilized to schedule and assign tasks to the correct processing node. Further, by employing distributed task schedulers that can automatically recalibrate and assign tasks to their own processing nodes, the presently disclosed systems and methods can be tolerant of individual node failure.

A task is typically defined as a unit of work or execution and in the present disclosure, tasks can be of any type—e.g., they can be service request tasks, data retrieval tasks, or tasks to perform tests. Further, the types of tasks need not be the same. For example each processing node may be configured to perform variety of tasks.

In the following sections, from time to time operations of the underlying systems will be described with reference to particular types of tasks—synthetic tests that may be used to monitor the performance of server applications. A synthetic test is typically a scripted test that simulates user interactions with a particular application. For a given server-hosted application, multiple synthetic tests may be scripted (e.g., a test may be scripted to simulate a user logging into a website/application, another test may be scripted to simulate an ecommerce transaction, a third test may be scripted for opening a particular webpage). In order to effectively monitor the performance of an application, each of these synthetic tests is generally scheduled to execute multiple times (e.g., every 5 minutes, every 30 seconds, or every day).

Although task scheduling will be described with reference to synthetic tests throughout this disclosure, it will be appreciated that the teachings herein are not in any way limited to the scheduling of synthetic tests, but more broadly can be used to schedule any type of computer tasks.

The embodiments described herein are implemented using one or more computer systems. An example computer processing system will be described with reference to FIG. 1.

Following this, example system architectures and processes for scheduling tasks will be described, initially with respect to scheduling amongst a group of processing nodes and then with respect to scheduling amongst multiple processing groups. For ease of reference, the description follows this outline:

1. Computer system overview
2. Task scheduling amongst a plurality of processing nodes
   2.1 Example architecture
   2.2 Process for receiving task requests
   2.3 Process for creating scheduled tasks
   2.4 Process for assigning tasks at a particular processing node
   2.5 Process for executing tasks at a particular processing node
   2.6 Task scheduling amongst a plurality of processing nodes: embodiments
3. Task scheduling amongst a plurality of processing groups
   3.1 Example architecture
   3.2 Process for receiving task requests
   3.3 Process for scheduling tasks
   3.4 Process for checking ownership and executing tasks at a particular
   processing node
   3.5 Setting task execution preferences
   3.6 Offsetting task execution times
   3.7 Task scheduling amongst a plurality of processing groups: embodiments 1. Computer System Embodiments and features described herein are implemented by one or more special-purpose computing devices. The special-purpose computing devices may be hard-wired to perform the techniques described, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, server systems, or any other device/system that incorporates hard-wired and/or program logic to implement the techniques.

For example, FIG. 1 is a block diagram that illustrates a computer system 100 upon which embodiments of the invention may be implemented. For example, each of the processing nodes, client devices, and/or the task management system discussed below may be implemented as separate computer systems such as computer system 100.

Computer system 100 includes a bus 102 or other communication mechanism for communicating information, and a hardware processor 104 coupled with bus 102 for processing information. Hardware processor 104 may be, for example, a general purpose microprocessor (e.g. a CPU) or a special purpose processor (e.g. a graphical processing unit or GPU).

Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions by the processor 104. Such instructions, when stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk, solid state disk, or optical disk, is provided and coupled to bus 102 for storing information and instructions.

In case the computer system 100 is implemented as a user interface device, it may be coupled, via bus 102, to one more output devices such as a display 112 for displaying information to a computer user. Display 112 may, for example, be a cathode ray tube (CRT), a liquid crystal display (LCD), a light emitting diode (LED display), or a touch screen display. An input device 114, including alphanumeric and other keys, may be coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. Additional and/or alternative input devices are possible, for example touch screen displays.

Computer system 100 may implement the techniques described herein using customized hard-wired logic, one or more ASICs or FPGAs, firmware and/or program logic which in combination with the computer system causes or programs computer system 100 to be a special-purpose machine. In certain embodiments, the techniques herein are performed by computer system 100 in response to processor 104 executing one or more sequences of one or more instructions contained in main memory 106. Such instructions may be read into main memory 106 from another storage medium, such as storage device 110. Execution of the sequences of instructions contained in main memory 106 causes processor 104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 110. Volatile media includes dynamic memory, such as main memory 106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card, cable modem, satellite modem, or a modem to provide a data communication connection to a corresponding type of communications or telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution.

A computer system as described herein may be configured in a plurality of useful arrangements. In one approach, a data processing method comprises using a computer system, obtaining from one or more non-transitory computer-readable data storage media a copy of one or more sequences of instructions that are stored on the media and which when executed by the computer system processor cause the computer system to perform (either alone or in combination with one or more additional computer systems), the techniques that are described herein.

A computer system may take a variety of forms. For example, a client device such as system 202 may be in the form of a desktop computer, a laptop computer, a notebook computer or the like. A server side system such as the task management system and/or the processing nodes may be in the form of virtual machine instances operating on a processing system.

Figure 2:
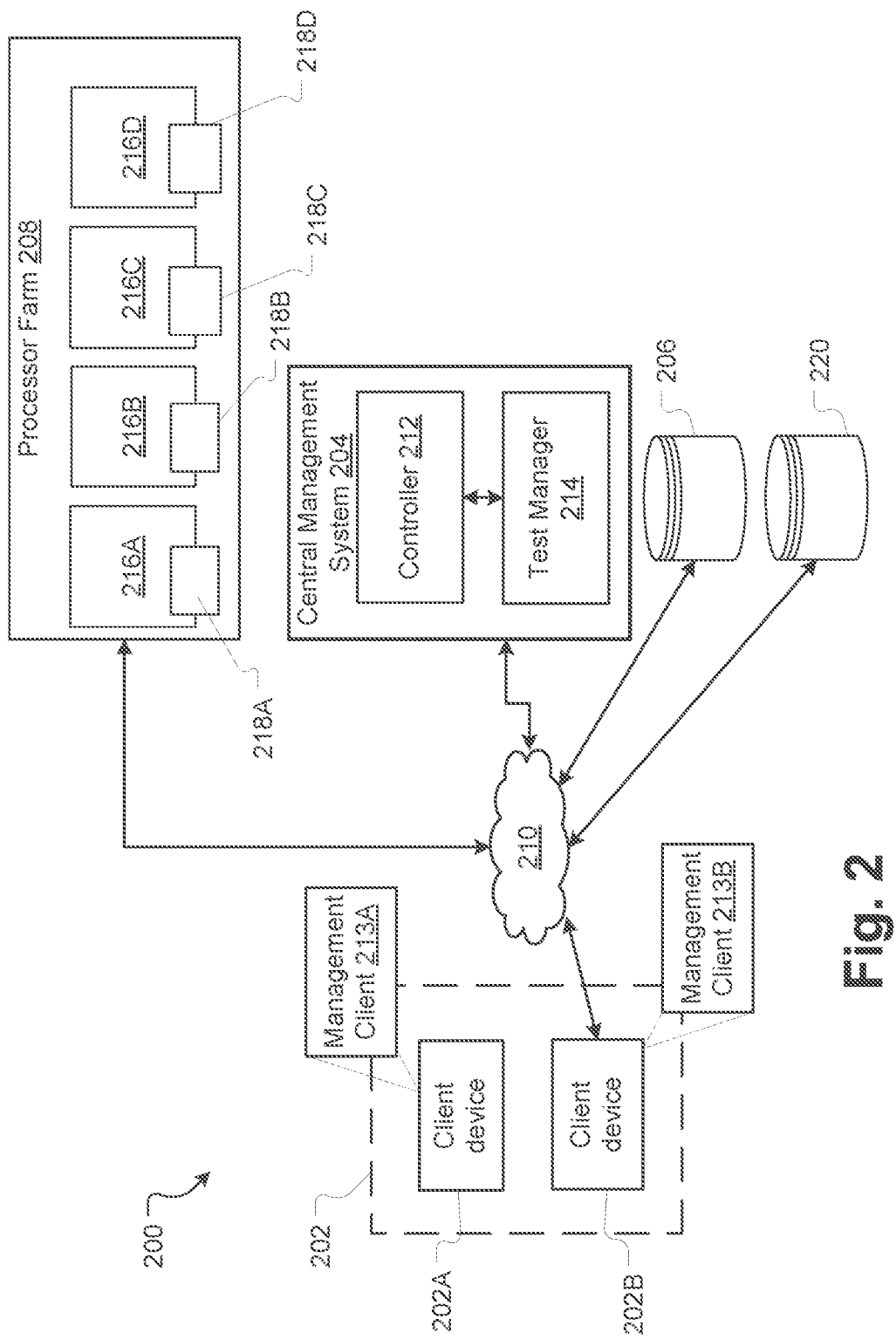
FIG. 2 is a block diagram illustrating a network environment in which certain aspects of the present disclosure may be implemented.

2. Task Scheduling Amongst a Plurality of Processing Nodes 2.1 Environment Overview FIG. 2 illustrates an environment 200 in which aspects of the present disclosure are implemented. The environment 200 includes one or more client devices 202, a task management system 204, a task database 206, an membership database 220, and a processor farm 208. The client devices 202, task management system 204, processor farm 208, membership database 220 and task database 206 communicate with each other over one or more communication networks 210.

The client devices 202 are configured to generate requests for synthetic tests and display results of executed tests to users. To perform these functions, the client devices are configured to communicate with the task management system 204 (e.g., to submit the requests for synthetic tests and to retrieve test results). In certain embodiments, the client devices 102 include a management client 213 to perform these functions.

The management client 213 may be a dedicated client or a web client (e.g., a web browser) configured to allow the client device 202 to communicate with the task management system 204. For example, it may allow a user of the client device to create a request for a synthetic test, forward the test request to the management system 204, periodically receive test results from the management system 204 and display the retrieved test results.

Only two client devices (202A and 202B) have been illustrated, but normal operation of the control system 104 typically involves many more client devices connected to the control system 104 to request synthetic tests and retrieve test results.

The task management system 204 is configured to manage tasks (e.g., synthetic tests). To this end, it includes a controller 212 and a task manager 214. The controller 212 is typically responsible for receiving requests from client devices 202, scheduling the synthetic tests based on test parameters included in the requests, instructing the task manager 214 to perform the tests, receiving test results from the task manager 214 and storing these in the test database 206.

The task manager 214 is configured to execute tasks (e.g., synthetic tests) and to do this, the task manager 214 utilizes one or more processing nodes in the processor farm 208. In case the processor farm 208 is hosted on a container management system, the task manager 214 communicates with the container management system (such as Amazon Web Services EC2 Container Services, Kubernetes, etc.) to provision one or more processing nodes to deploy the synthetic tests. Alternatively, in case the processor farm 208 is hosted on a dedicated om-premises data center, the task manager 214 communicates directly with the processing nodes 216.

The processor farm 208 may be a collection of one or more processing nodes 216 configured to deploy scheduled tasks. As described previously, in certain embodiments, the processor farm 208 may be hosted by a container management system, e.g., when the task manager 214 services a large number of clients or has to deploy a large number of tasks simultaneously. In alternative embodiments, e.g., when the task manager 214 services a small number of clients or runs a small number of tasks, the processor farm 208 may be hosted on physical on-premises devices.

In either case, each processing node 216 in the processor farm 208 may be configured to retrieve scheduled tasks, execute the retrieved tasks according to their schedules, and communicate results of executed tasks back to the task manager 214. Further, each processing node 216 is equipped with a task scheduler 218 which may be configured to communicate with the task management system 204, the task database 208 and the membership database 220 to assign scheduled tasks to its associated processing node 216. Each processing node 216 in the farm is identified by a unique node identifier.

In certain embodiments, the processor farm 208 may be scaled based on demand. For instance, if the number of active processing nodes 216 is not sufficient to execute scheduled tasks at a particular period in time, the processor farm 208 may be scaled up—i.e., one or more new processing nodes may be initialized or started. Alternatively, if the active processing nodes are being underutilized at a particular period of time, the processor farm 208 may be scaled down—i.e., one or more processing nodes may be terminated. Typically, when a container management system is employed, this scaling up or down is automatic. That is, parameters may be provided to the container management system in advance that dictate when the container management system is supposed to scale up or scale down the processor farm 208 (e.g., upon reaching a certain threshold utilization rate).

The task database 206 stores task related data including, e.g., task descriptors for tasks scheduled by the task management system. In addition, the task database may store test results (e.g., test logs, and test metadata such as execution times, start times, end times, duration of tests, etc.). In some embodiments, this data may be transmitted to the test database 206 by the control system 204.

In addition to storing task related data, the database 206 is configured to service data requests from the task management system 204, the processing nodes 216, and the client devices 202. For example, it may be configured to receive test result requests from client devices 102 and communicate the corresponding test results to the client devices 102. Similarly, it may be configured to receive requests for task descriptors from the control system 104 and service these requests accordingly.

The membership database 220 is configured to store data related to active processing nodes. The task scheduler 218 associated with each processing node 216 is generally configured to "check in" with the membership database to let the membership database 220 know it is still active. This "check in" may be performed automatically in a periodical fashion (e.g., every second, every 5 seconds, every 15 seconds, etc.). Each time a task scheduler "checks in" with the membership database 220, the database is configured to store a record of the check in. In one example, the check in may be a simple push of processing node related data (such as the unique processing node identifier, and a timestamp of the time at which the data was pushed).

An example of a data structure storing activity information is illustrated in Table A below. Although a table is used to illustrate the data structure, the relevant information need not be stored in a table and could be stored in any appropriate format.

TABLE A

Example Membership database structure

| Processing node identifier | Last check-in |
|---|---|
| 914ca1359132c6de2e4caf4f2661bca1 | 2018-09-25T03:46:22.1238237Z |
| 70c505856690120f106d6a8bb46e41b7 | 2018-09-25T03:46:21.0237643Z |
| 630a6272325fad04d3dd2562cbaea727 | 2018-09-25T03:46:21.9236263Z |
| . . . | . . . |

In the above example table, each row corresponds to a particular check-in and includes information such as: the unique processing node identifier of the processing node 216 that performed the check-in and a time at which the check in was performed. In certain embodiments, this table may be continuously updated and new entries may be created and added to the top or bottom of the table with each new check-in.

In some cases, the test database 206 and/or the membership database 220 may be hosted on a private server, for example, on the same platform as the task management system 204. However, in majority of cases, the test database 206 and/or the membership database 220 are hosted on public infrastructure such as a cloud storage platform. For example, the test results may be stored in the form of tables in a cloud database such as Amazon DynamoDB®.

The various elements of system 200 may communicate with each other via suitable communication networks 210. For example, the client devices 202 may communicate with the task management system 204 via private or public networks, whereas the processing nodes 116 may communicate with the task database 206, membership database 220, and the task management system 204 via public networks. It will be appreciated that based on the required implementation, any suitable communication network 210 may be utilized to allow communication between the systems in environment 200.

2.2 Process for Receiving Test Requests

Figure 3:
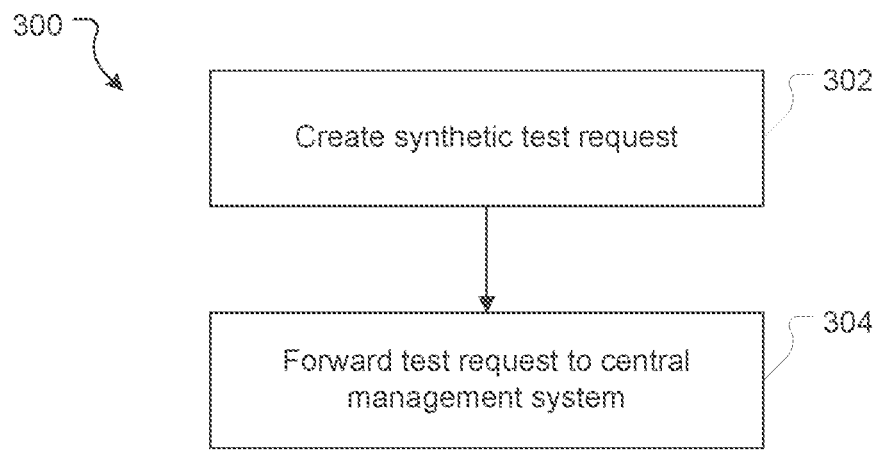
FIG. 3 is a flowchart illustrating a process for requesting services in accordance with certain embodiments.

FIG. 3 is a flowchart illustrating a method 300 for receiving a task request. This method is described with reference to synthetic test requests and in particular, with reference to a single synthetic test request. However, it will be appreciated that in actual implementation of a monitoring system, the system 200 is configured to receive multiple such test requests from multiple end users for multiple remote applications.

Generally speaking, administrators may setup synthetic tests to perform any type of monitoring function on their server applications. Examples of synthetic tests can include a simple ping to a particular URL, an application login test, or execution of specific transactions on a particular application. The method begins at step 302, where a task request (e.g., for a synthetic test) is created. The task request may be created at the client device 202 and in particular using the management client 213 executing on the client device.

The task request includes information about the task (e.g., the synthetic test) to be executed and may include for example, an identifier for the particular test (e.g., a name, a unique identifier, etc.), a start time for executing the test, a frequency of how often the test should be executed (e.g., every 10 minutes, every 15 minutes, every hour, every day, etc.), any stopping conditions for the test (e.g., maximum timeout value), and a test script.

In certain embodiments, a user may be able to create a new synthetic test request via the management client 213. For example, the user may be able to select a "new test" option that allows the user to enter information about test. Further, the management client 213 may allow the user to create a script for the test. For instance it may provide an option to write the code for the test script or to automatically create the test script by recording steps of the test such as loading a page, clicking a link, or selecting an object in the client application. In some examples, this may be done by a script recording tool, such as the Selenium IDE add-on offered by the web browser automation tool, Selenium. With a script recording tool, actions performed on the client application (e.g. the web browser or dedicated client) are automatically converted into commands of a test script).

Once test information is received, the management client 213 creates the task request. An example task request is illustrated in Table B below. Although a table has been used to illustrate information stored in the task request, the relevant information need not be stored in a table and could be stored in any appropriate format (e.g. a simple text file, a JSON file, an XML file).

TABLE B

Example task request

| | |
|---|---|
| Synthetic test ID | [OBS] Splunk Login |
| Test start time | 26 February 2018 12:00:00 |
| Frequency | 10 minute intervals |
| Test conditions | Timeout after 1 minute |
| Test script | (see below) |

```
require('./helpers/selenium' );
const { By, until } = $webdriver;
const SCRIPT_TIMEOUT = 10000;
const PAGE_LOAD_TIMEOUT = 20000;
const LOGIN_WAIT_DELAY = 15000;
const { LOGIN_URL } = $check.args;
const printContent = function (title, body) {
console.log(`\n${title}\n=========================\n`);
console.log(body);
console.log(`\n=========================\n`);
return true;
};
const printPageBodyContent = function ( ) {
return $driver.findElement(By.tagName('body')).getAttribute('innerHTML').then(function(body)
{
    printContent('Login page body content', body);
})
}
const printLogs = ( ) => Promise.all([
$driver.manage( ).logs( ).get($webdriver.logging.Type.BROWSER).then(function(entries) {
    printContent('Console logs', entries);
}),
$driver.manage( ).logs( ).get($webdriver.logging.Type.DRIVER).then(function(entries) {
    printContent('Driver logs', entries);
}),
]);
const fail = (reason) => {
printLogs( ).then(( ) => {
    $check.fail(reason);
});
};
const timeouts = $driver.manage( ).timeouts( );
timeouts.setScriptTimeout(SCRIPT_TIMEOUT);
timeouts.pageLoadTimeout(PAGE_LOAD_TIMEOUT);
$driver.get(LOGIN_URL).then(( ) => {
$check.time('Loaded Login page');
}, ( ) => {
fail(`Unable to open ${LOGIN_URL} in ${PAGE_LOAD_TIMEOUT}ms.`);
});
$driver.wait(until.titleIs('Login | Splunk'), LOGIN_WAIT_DELAY).catch((err) => {
return printPageBodyContent( ).then(( ) => {
    fail(`Page title did not match: $ {err}`);
});
});
$driver.findElement(By.id('username')).sendKeys($check.args.OE_TESTUSER_BOT_USER);
$driver.findElement(By.id('password')).sendKeys($check.secrets.OE_TESTUSER_BOT_PASS);
$driver.findElement(By.css('input[type=submit]')).click( ).then(( ) => {
$check.time('Logging in user...');
});
$driver.wait(until.titleMatches(/^Search\|Splunk/), LOGIN_WAIT_DELAY).then(res) => {
$check.pass('Login success');
}, (err) => {
fail(`Login failed: ${err}`);
```

This example task request is created for monitoring the login performance for a particular application (splunk) available via a web server. Accordingly, the test script provided in the request includes the URL for the landing/login page of the web application, a test username and a test password for attempting to login. The test script also includes code for outputting that the test is successful if the test is completed within a particular period of time, for recording times when certain steps are performed in the test (e.g., test starting time, time when the login page loads, time when the website attempts to log in the user, and the time when login is successful). In addition to this, the test script includes code for outputting that the test has failed if the website times out at any of the test steps (i.e., loading webpage, logging in the user, or displaying user account webpage after logging in) and for outputting at which stage the test failed. When the script is eventually executed, a test log is created from these outputs.

At step 304, the management client 213 forwards the task request to the task management system 204.

2.3 Process for Creating Scheduled Tasks

Figure 4:
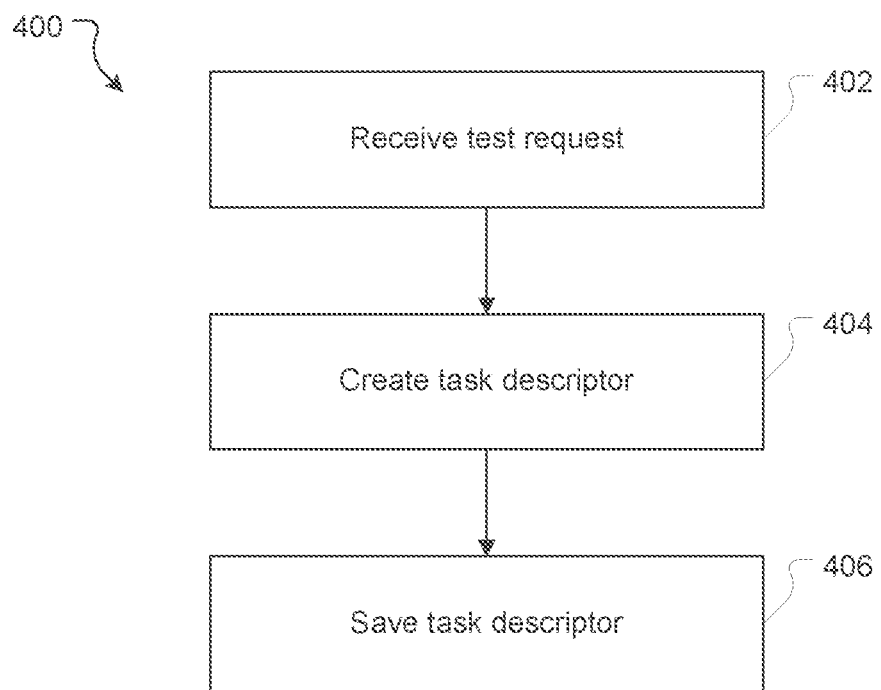
FIG. 4 is a flowchart illustrating a process for scheduling tasks in accordance with certain embodiments.

FIG. 4 is a flowchart 400 illustrating an exemplary method for creating a scheduled task. The method begins at step 402, where the task management system 204 receives a task request. Upon receiving the task request, the task management system 204 may be configured to create scheduled tasks for the corresponding test. In particular, it may be configured to create a task descriptor for the task based on the received task request. This is done at step 404.

The task descriptor may include information for uniquely identifying the task (e.g., a unique task ID), identifying the requesting party (e.g., requesting party ID), identifying the particular task (e.g., unique test ID received in the test request), a test execution time, frequency for conducting the test, and the test script. When test information is provided in the test request, the control system 104 utilizes this information to create the one or more task descriptors. Alternatively, if one or more parameters required to schedule the test are not provided in the test request, the control system 104 may be configured to set default values for these parameters. An example task descriptor is illustrated in Table C below.

TABLE C

Example monitoring task descriptor

| | |
|---|---|
| Task ID | 283f543e3a4335493d464f4277 |
| Requestor ID | ddc8e7df24390890 |
| Synthetic test ID | [OBS] Splunk Login |
| Test start time | 26 February 2018 12:00:00 |
| Frequency | 10 minute intervals |
| Test conditions | Timeout after 1 minute |
| Test script | See example in table A above |

Once the task descriptor is created, it is saved in the test database 206 at step 406. In one embodiment, the task descriptors may be stored in a task descriptor database within the test database 206 in an ordered queue (or scheduling buffer)—depending on the test start time. Further, when a processing node 216 executes a particular instance of the task, the processing node may communicate a test log back to the task management system 204 and if the test was successfully executed, the task management system 204 updates the test start time to the subsequent time the test needs to be executed (based on its frequency) and reorders the task descriptor in the queue. For example, if the frequency of the test is 10 minutes, the control system 104 may be configured to update the start time in the task descriptor to 10 minutes later.

2.4 Process for Determining Range of Assigned Tasks

Once task descriptors are created and stored they need to be assigned to processing nodes 216 for execution in a uniform manner—such that the active processing nodes are equally utilized. One way of achieving this is to substantially equally divide the number of tasks between the numbers of active processing nodes. To achieve this, in the present disclosure, each task descriptor stored in the database 206 can be assigned an allocation identifier. The allocation identifier may be a random unique identifier that has a fixed value within a particular range of values (e.g., 0-N) and the allocation identifier may be assigned in such a manner that the task descriptors are uniformly distributed within the range (0-N).

One way to assign such an allocation identifier to a test descriptor includes the use a uniform distribution hash function, which converts an input value (e.g., the task ID) into a fixed value in the range 0-N. This way, all task descriptors can be allocated a number within that number range (e.g., 0-65535). Then, the range of allocation identifiers can be equally divided amongst the active processing nodes.

However, as task scheduling is not performed centrally, but in a distributed fashion at each processing node, the task scheduler 218 of each processing node 216 has to compute its own range of allocation identifiers. To facilitate this, each task scheduler is initially made aware of the total range of values within which each of the allocation identifiers may fall (e.g., 0-65535) and is configured to apply the same hash function in the same manner to create allocation identifiers.

Figure 5:
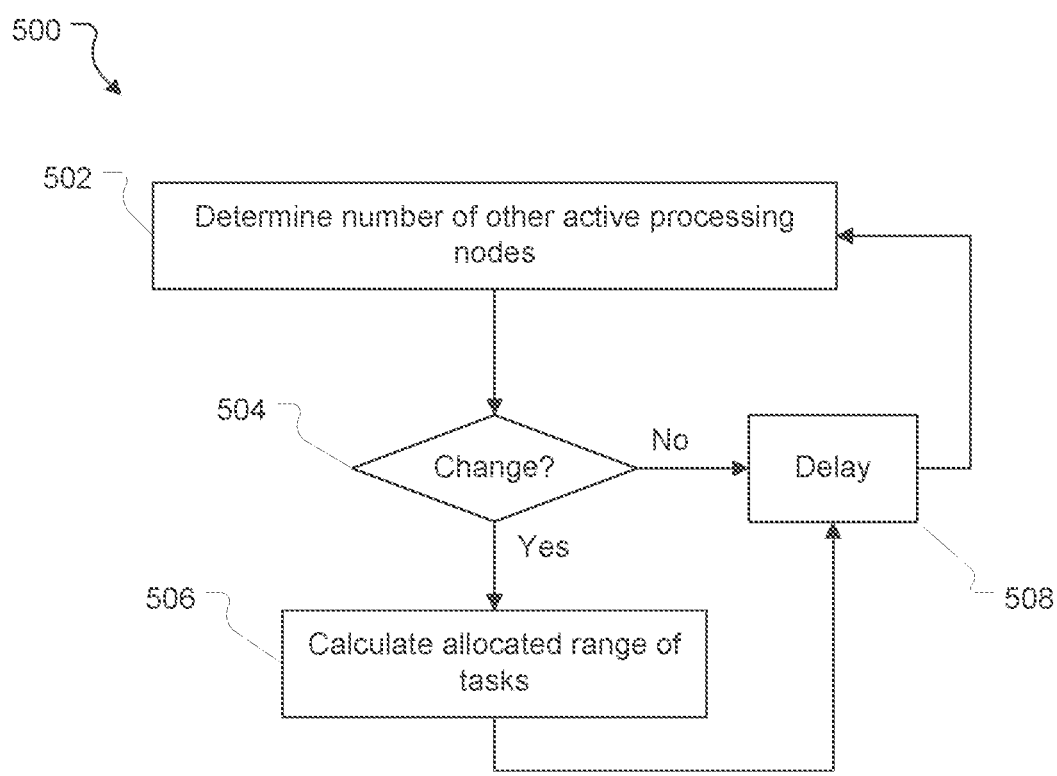
FIG. 5 is a flowchart illustrating a process performed by a particular processing node to execute tasks.

FIG. 5 is a flowchart illustrating a method 500 for determining the range of allocation numbers assigned to a particular processing node.

The method begins at step 502, where the task scheduler 218 of a particular processing node, e.g., processing node 216A, determines the number of other active processing nodes. To this end, in certain embodiments, the task scheduler 218 retrieves a list of other active processing nodes from the membership database 220.

In case the membership database 220 stores information about active processing nodes as shown in Table A, the task scheduler 218A may be configured to retrieve the entire table of data. Alternatively, the task scheduler may be configured to query the membership database 220 to retrieve a portion of the information that is sufficient to indicate the number of active processing nodes. In such cases, the task scheduler 218 may be configured to retrieve a predetermined number of latest entries from the membership database 220 (e.g., it may be configured to retrieve the latest 50 entries) or retrieve entries within a predetermined time period (e.g., it may be configured to retrieve entries made to the membership database in the last 30 seconds, if each task scheduler is configured to check in every 15 seconds).

Then, based on the retrieved data, the task scheduler 218 determines the number of active processing nodes. For instance, if the entire table is retrieved, the task scheduler 218 may filter the results to reveal entries that correspond to a particular time period (e.g., a time period within which each of the active processing nodes should have ideally checked-in at least once with the membership database 220), and then perform deduplication on the filtered entries based on the processing node identifier to obtain a list of distinct processing nodes. Alternatively, if a portion of the database corresponding with a last check-in period for the processing nodes is retrieved, the task scheduler 218 may de-duplicate the list of retrieved entries based on the processing node identifiers to obtain a list of distinct processing node identifiers and consider the processing nodes corresponding to this list to be currently active.

At step 504, a determination is made whether there is any change in the active processing nodes. To this end, the list of distinct active processing nodes obtained at step 502 is compared with a list of distinct active processing nodes obtained previously. If there are any changes, e.g., if the number of active processing nodes have changed (e.g., because a processing node was terminated or a new processing node was initiated) or the unique identifiers of the active processing nodes have changed (e.g., because a processing node was terminated and a new processing node was initiated between two checks), the method proceeds to step 506. It will be appreciated that if step 502 is performed for the very first time a processing node is initiated, there will be no previously determined list of active processing nodes and in this case the task scheduler will determine that there is a change at step 504 and the method will proceed to step 506.

At step 506, the task scheduler 218 determines the range of tasks assigned to its own processing node 216A based on the identified change. To this end, the task scheduler 218 may divide the arbitrary range of numbers (1-N) by the number of active processing nodes (determined in step 502).

This indicates the range of numbers that should be assigned to each processing node 216. For example, if the range of numbers is 0-65535 and there are five processing nodes, each processing node will be responsible for ranges of 13107 numbers. Further, once the ranges are determined, the task scheduler identifies the particular range assigned to it. In one embodiment, this identification may be made based on a lexical ordering of the processing node identifiers of the active processing nodes. However, in other embodiment, any other ordering technique for resolving an order of precedence of the nodes may be utilized as long as every task scheduler knows the particular technique employed and has the information to order the processing nodes in the same manner as other task schedulers.

Alternatively, if the number of active processing nodes is the same but there is a difference in the unique identifiers of the active processing nodes, the task scheduler 218 may be configured to determine whether the range of allocation identifiers assigned to it have changed e.g., because of a difference in the precedence ordering of the active processing nodes. If the range of allocation identifiers assigned to it have in fact changed (e.g., from 1-20 to 21-40), the task scheduler may be configured to identify the new range and store it.

If at step 504, a determination is made that the number or unique identifiers of the active processing nodes has not changed from a previous determination, the method directly proceeds to step 502 after a predetermined delay at step 508 (e.g., 5 seconds).

Method 500 is a cyclic process that repeats as long as the processing node 216A is active and this method may be performed by all the active task schedulers 218 to ensure that they are aware of the number of other active processing nodes 216 and have allocated the correct range of allocation identifiers to their own processing node.

Further, as described previously, the task scheduler is also configured to "check-in" with the membership database automatically and periodically. In certain embodiments this check-in may be performed each time method step 502 is performed. In alternate embodiments, the check-in may be performed independently and/or at a different frequency than method 500.

2.5 Process for Executing Tasks

Figure 6:
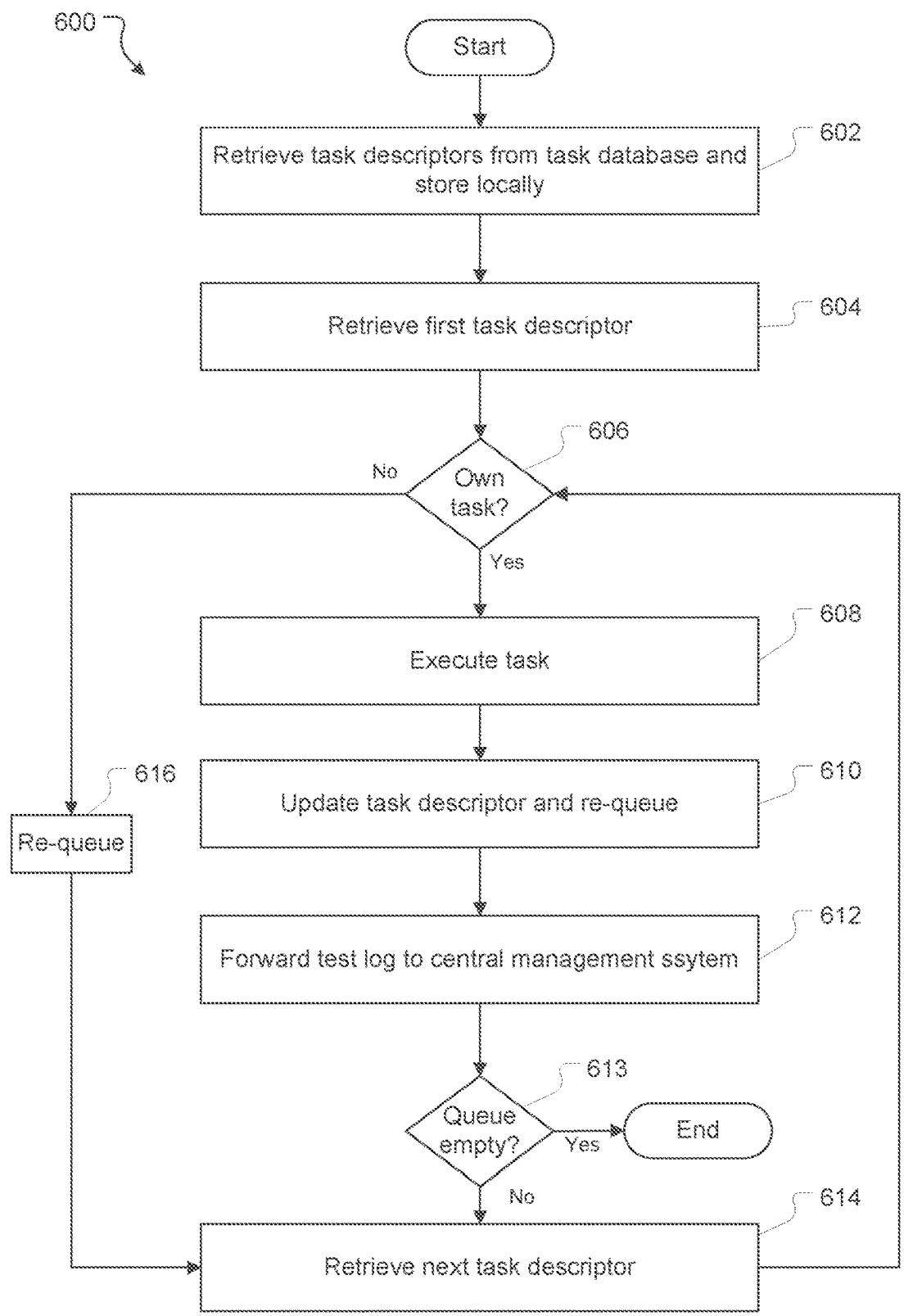
FIG. 6 is a flowchart illustrating a process performed by a particular processing node to maintain a schedule of tasks for execution in accordance with certain embodiments.

FIG. 6 is a flowchart illustrating an exemplary method for executing tasks. In particular, method 600 is described with reference to a single processing node (e.g., processing node 216A) and its task scheduler (e.g., task scheduler 218). However, it will be appreciated that all active processing nodes in the processor farm 208 may be configured to perform method 600 simultaneously.

The method commences at step 602, where the task scheduler 218 retrieves the task descriptors stored in the task database 206 and stores these locally in the processing node's memory. In case the task descriptors were maintained in an ordered queue in the task database, the task scheduler may simply store the ordered queue. Alternatively, if the task descriptors were not previously ordered, the task scheduler may be configured to order the task descriptors in a scheduling buffer, e.g., based on the test start time.

Next, at step 604, the task scheduler 218 retrieves a first test descriptor in the queue from the processing node's memory for execution.

At step 606, the task scheduler 218 determines whether the retrieved task is assigned to it. To that end, in certain embodiments, the task scheduler 218 may perform a hash function on the task identifier associated with that task descriptor to convert the task identifier into the allocation identifier. If the converted hash value (i.e., the allocation identifier) falls within the range of allocation identifiers assigned to that processing node (as determined by method 500), the task scheduler 218 determines that the task is assigned to it and the method proceeds to step 608.

At step 608, the processing node 216A executes the task. For example, it may execute the test script and write the test output in a test log file.

At step 610, the task scheduler 218 updates the task descriptor and re-queues it. In certain embodiments, the test start time for the task descriptor may be updated to the next time the task is supposed to be executed (e.g., based on the frequency of the task) and the task descriptor may be re-queued based on its next test start time at this step.

At step 612, the test log is forwarded to the task management system (which stored the test log in the task database 206 and updates the test start time for that task in the task database 206).

Subsequently, at step 613 a determination is made whether the task queue is empty—e.g., because all tasks are completed or the task queue has been erased. If a determination is made that the task queue is empty, the method 600 ends. Alternatively, if one or more task descriptors are still queued for execution in the queue, the method proceeds to step 614.

At step 614, the next task descriptor is retrieved from the queue for execution and the method proceeds to step 606. Steps 606-614 are repeated until all the test descriptors in the queue are executed. In most cases, as the task descriptors are re-queued, method steps 606-614 are repeated until the processing node terminates (e.g., because of network failure or automatically in response to lower demand).

Returning to step 606, if a determination is made that the task is not assigned to the current processing node 216A, e.g., because the computed allocation identifier does not fall within the range of numbers allocated to that processing node 216, the method proceeds to step 616 where the task descriptor is re-queued in the queue based on its next execution time. Thereafter, the method proceeds to step 614 where the next task descriptor in the queue is retrieved for execution.

In method 600 it is assumed that each task scheduler includes a queue of all the task descriptors and performs a check to determine whether that task descriptor is assigned to it for each task descriptor in the queue at execution time. In another embodiment, the task scheduler may receive batches of task descriptors at regular intervals from the task management system 204. For example, the task scheduler may retrieve a batch of task descriptors that are due for execution every 30 seconds and determine if it owns any of these task descriptors (e.g., by performing the method of step 606) before storing the task descriptors locally. In this case, only the task descriptors corresponding to tasks that are assigned to the processing node are saved in local memory of the task scheduler. In this example embodiment, a check need not be performed every time a task descriptor is retrieved from the local memory.

Further still, methods 500 and 600 are described as standalone methods being performed concurrently but independently at each task scheduler 218. This might not always be the case. In fact, in certain embodiments, method 500 may be performed in combination with method 600. In particular, the task scheduler 218 may perform method steps 502 and 504 (i.e., retrieving the list of active processing nodes and determining the allocated range of tasks) each time method step 606 (i.e., determining whether the task is assigned to the task scheduler) is performed. In this case, the remaining steps of method 500 may be omitted.

The step of retrieving task descriptors from the task database 206 and storing locally (i.e., step 602) can be performed in a periodic fashion independently of the remainder of method 600. For instance, each task scheduler may retrieve the list of task descriptors from the task database 206 every 30 seconds and compare the retrieved task descriptors with the task descriptors stored in its local scheduling buffer to determine whether any new task descriptors were added since the last retrieval, any task descriptors were removed, or if any task descriptors were updated (e.g., by changing a task execution frequency). If any changes are detected, the task descriptors corresponding to the detected changes may be added, removed, or swapped.

2.6 Task Scheduling Amongst a Plurality of Processing Nodes: Embodiments

Example embodiments relevant to task scheduling amongst multiple processing nodes are set out in the following numbered clauses:

Clause 1: A method for scheduling tasks, the method comprising: at a task scheduler of a processing node of a plurality of processing nodes: retrieving a first task descriptor from a local memory, the task descriptor corresponding to a task scheduled for execution at the current time and comprising at least a task execution time, a frequency for performing the task, and a task identifier; determining whether the task descriptor is assigned to the task scheduler for execution; if it is determined that the task descriptor is assigned to the task scheduler for execution: executing the task; updating the task execution time based on the current task execution time and the frequency for performing the task; and re-queuing the task descriptor in the local memory.

Clause 2: The method of clause 1, wherein determining whether the task descriptor is assigned to the task scheduler for execution comprises: determining the number of active processing nodes; determining a range of allocation identifiers assigned to the processing node based at least in part on the number of active processing nodes; converting the task identifier into an allocation identifier; determining whether the allocation identifier is within the range of allocation identifiers assigned to the processing node.

Clause 3: The method of clause 2, wherein determining a range of allocation identifiers assigned to the processing node is further based on a precedence ordering of the active processing nodes.

Clause 4: The method of clause 2, wherein determining whether the task descriptor is assigned to the task scheduler for execution further comprises: determining that the task descriptor is assigned to the task scheduler if the allocation identifier is within the range of allocation identifiers assigned to the processing node; and determining that the task descriptor is not assigned to the task scheduler if the allocation identifier is not within the range of allocation identifiers assigned to the processing node.

Clause 5: The method of clause 2, wherein if it is determined that the task descriptor is not assigned to the task scheduler for execution, the method further comprising: updating the task execution time based on the current task execution time and the frequency for performing the task; and re-queuing the task descriptor in the local memory.

Clause 6: The method of clause 2, wherein determining the number of active processing nodes further comprises: retrieving from an external database a list of entries, each entry corresponding to a processing node announcing its existence to the external database and comprising at least a processing node identifier and a time stamp of the time of the announcement; and filtering the list of entries to one or more distinct processing node identifiers, wherein each distinct processing node identifier corresponding to an active processing node.

Clause 7: The method of clause 5, further comprising: filtering the retrieved list of entries to entries corresponding to announcements made in a predetermined time period.

Clause 8: The method of clause 1, further comprising: periodically announcing the existence of the processing node to an external database, the announcement comprising an identifier of the processing node and a timestamp indicating the time of the announcement.

Clause 9: The method of clause 1, further comprising: determining whether the number of active processing nodes has changed; in response to determining the number of active processing nodes has changed, recalculating a range of allocation identifiers assigned to the processing node based at least in part on the number of active processing nodes.

Clause 10: A task scheduler for scheduling tasks, the task scheduler operating on a processing node of a plurality of processing nodes, wherein each processing node includes its own task scheduler, the task scheduler configured to: retrieve a first task descriptor from a local memory, the task descriptor corresponding to a task scheduled for execution at the current time and comprising at least a task execution time, a frequency for performing the task, and a task identifier; determine whether the task descriptor is assigned to the task scheduler for execution; if it is determined that the task descriptor is assigned to the task scheduler for execution: execute the task; update the task execution time based on the current task execution time and the frequency for performing the task; and requeue the task descriptor in the local memory.

Clause 11: The task scheduler of clause 10, wherein to determine whether the task descriptor is assigned to the task scheduler for execution, the task scheduler is further configured to: determine the number of active processing nodes; determine a range of allocation identifiers assigned to the processing node based at least in part on the number of active processing nodes; convert the task identifier into an allocation identifier; determine whether the allocation identifier is within the range of allocation identifiers assigned to the processing node.

Clause 12: The task scheduler of clause 11, wherein determining the range of allocation identifiers assigned to the processing node is further based on a precedence ordering of the active processing nodes.

Clause 13: The task scheduler clause 11, wherein to determining whether the task descriptor is assigned to the task scheduler the task scheduler is further configured to: determine that the task descriptor is assigned to the task scheduler if the allocation identifier is within the range of allocation identifiers assigned to the processing node; and determine that the task descriptor is not assigned to the task scheduler if the allocation identifier is not within the range of allocation identifiers assigned to the processing node.

Clause 14: The task scheduler of clause 11, wherein if it is determined that the task descriptor is not assigned to the task scheduler for execution, the task scheduler is further configured to: update the task execution time based on the current task execution time and the frequency for performing the task; and requeue the task descriptor in the local memory.

Clause 15: The task scheduler of clause 11, wherein to determine the number of active processing nodes, the task scheduler is further configured to: retrieve from an external database a list of entries, each entry corresponding to a processing node announcing its existence to the external database and comprising at least a processing node identifier and a time stamp of the time of the announcement; and filter the list of entries to one or more distinct processing node identifiers, wherein each distinct processing node identifier corresponding to an active processing node.

Clause 16: The task scheduler of clause 15, further configured to: filter the retrieved list of entries to entries corresponding to announcements made in a predetermined time period.

Clause 17: The task scheduler of clause 10, further configured to: periodically announce the existence of the processing node to an external database, the announcement comprising an identifier of the processing node and a timestamp indicating the time of the announcement.

Clause 18: The task scheduler of clause 10, further configured to: determine whether the number of active processing nodes has changed; and in response to determining the number of active processing nodes has changed, recalculate a range of allocation identifiers assigned to the processing node based at least in part on the number of active processing nodes.

3. Task Scheduling Amongst a Plurality of Processing Groups

The systems and processes described above related to task scheduling amongst a plurality of processing nodes. However, in some cases, it might be necessary or desirable to execute tasks using different processing groups, e.g., in the case of synthetic tests, it may be desirable to execute a synthetic test in different geographical locations to determine whether the underlying application responds well to requests originating from different geographical locations. Further, if a particular processing group experiences an unexpected failure, the task requests may still be executed by the remaining processing groups.

In such cases, in addition to scheduling tasks amongst a plurality of processing nodes, the task schedulers also need to schedule tasks amongst two or more processing groups such that at any given time, only a single processing node in a single processing group is responsible for executing a particular task.

3.1 Environment Overview

Figure 7:
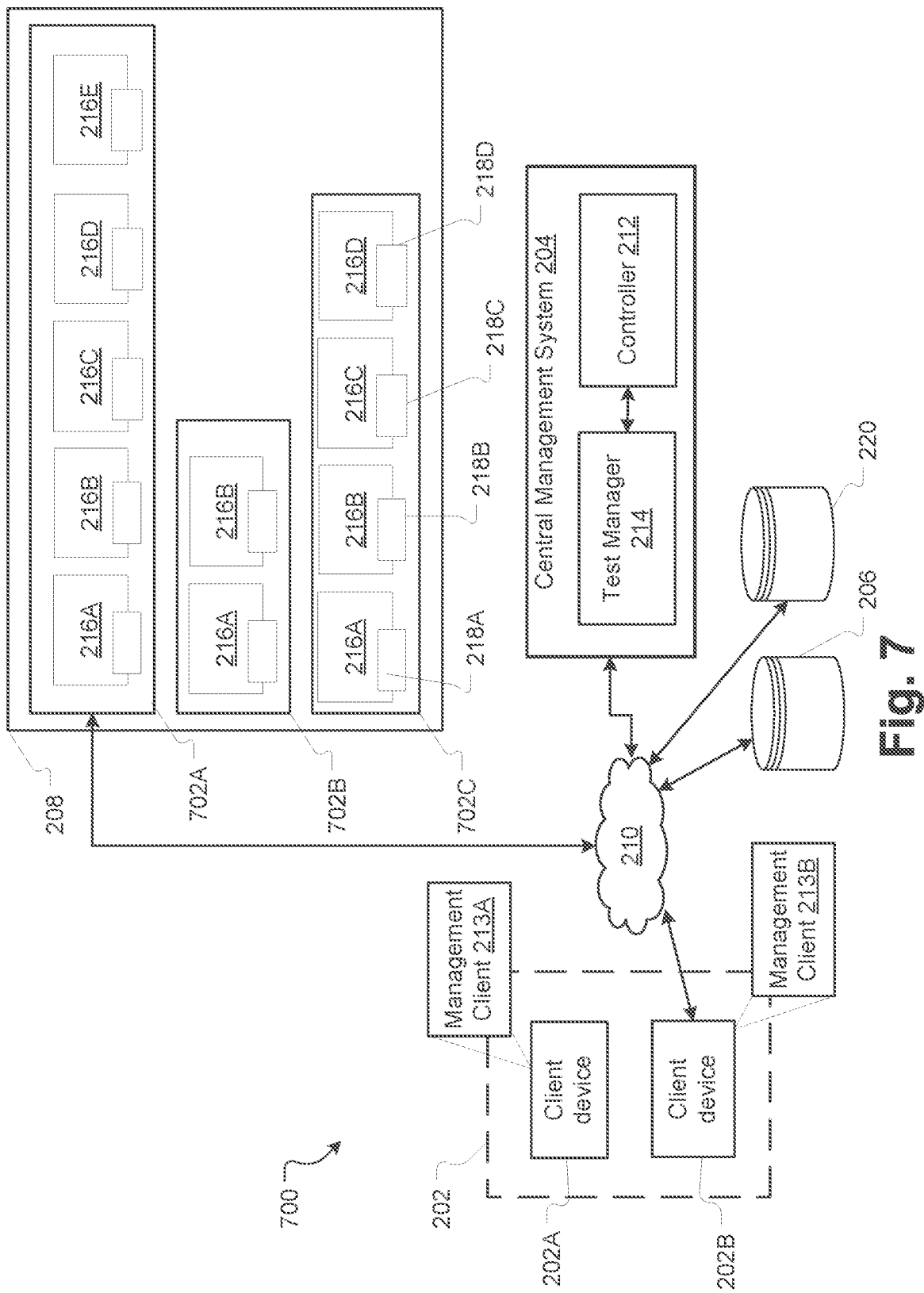
FIG. 7 is a block diagram illustrating a network environment in which certain aspects of the present disclosure may be implemented.

FIG. 7 illustrates an environment 700 in which aspects of the present disclosure are implemented. The environment 700 includes all of the same elements such as one or more client devices 202, a task management system 204, a task database 206, a membership database and a processor farm 208. The client devices 202, task management system 204, processor farm 208, membership database 220 and the task database 206 communicate with each other over one or more communication networks 210.

Environment 700 is similar to environment 200 and the individual elements of environment 700 perform the same functions as those described with reference to environment 200 and therefore the functions of these elements will not be described in detail in this section. The only differences between environment 200 and environment 700 exists in the processor farm 208 and the membership database 220.

The processor farm 208 in this embodiment includes two or more processing groups 702. The processing groups may be differentiated based on one or more parameters. For example, the processing groups may be differentiated based on geographical location. One processing group (e.g., processing group 702A) may be located in the east coast of the US, the second processing group (e.g., processing group 702B) may be located in the west coast of the US, and the third processing group (e.g., processing group 702C) may be located in Europe. As described previously, using processing groups in different locations may be desirable in certain cases. In other examples, the processing groups may be differentiated based on any other criteria. For example, sometimes multiple groups may be preferable for redundancy. In this case, processing node groups may be located within the same network, or the same building/city, etc. Oftentimes different processing groups may be employed such that each processing group is powered by a separate electrical circuit so that even if one processing group fails, the other processing groups are still able to operate and perform the tasks. Each processing group has its own unique group identifier that uniquely identifies that processing group.

Each processing group includes one or more processing nodes 216. The number of processing nodes 216 in each processing group 702 may vary. For instance, as depicted in FIG. 7, processing group 702A may include 5 processing nodes 216, processing group 702B may include two processing nodes and processing group 702C may include four processing nodes. It will be appreciated that the number of processing nodes per processing group may vary depending on demand, processing speeds of processing nodes within a group, unexpected failures or outages, etc. Each processing node may have its own unique node identifier that uniquely identifies that processing node and which processing group it is a member of.

Similar to the processing nodes described with reference to FIG. 2, each of the processing nodes in processor farm 208 includes its own task scheduler 218 configured to communicate with the task management system and assign scheduled tasks to its associated processing node 216.

In terms of the membership database 220, this database stores the types of information described with reference to FIG. 2 and in addition to that, stores data related to active processing groups in this embodiment (e.g., stores the unique group identifiers of each of the active processing groups).

An example of a data structure storing activity information for this embodiment is illustrated in Table D below. As illustrated, in addition to the processing node identifier and the last check in fields, this table also includes a processing group identifier field.

TABLE D

Example membership database structure

| Processing node identifier | Processing group identifier | Last check-in |
|---|---|---|
| 914ca1359132c6de2e4caf4f2661bca1 | US-East-1 | 2018-09-25T03:46:22.1238237Z |
| 70c505856690120f106d6a8bb46e41b7 | US-West-2 | 2018-09-25T03:46:21.0237643Z |
| 630a6272325fad04d3dd2562cbaea727 | Eu-West-1 | 2018-09-25T03:46:21.9236263Z |
| 3c2aece17e3ef7f88a397b97fbb68103 | US-West-2 | 2018-09-25T03:46:20.1458237Z |
| fce67875c8b33180bf5eff5d8fb04919 | US-East-1 | 2018-09-25T03:46:20.0007643Z |
| cd9fa499c2075f9aec2d01b644cb9f5b | US-West-2 | 2018-09-25T03:46:19.9421263Z |
| . . . | . . . | . . . |

In the above example table, each row corresponds to a particular check-in and includes information such as: the unique processing node identifier of the processing node 216 that performed the check-in, the processing group to which that processing node belongs and a time at which the check in was performed. In certain embodiments, this table may be continuously updated and new entries may be created and added to the top or bottom of the table with each new check-in.

3.2 Process for Receiving Task Requests

The process for receiving task requests is the same in both embodiments and therefore this process is not described in detail again in this section.

3.3 Process for Creating Scheduled Tasks

The process for creating scheduled tasks is the same in both embodiments and therefore this process is not described in detail again in this section.

3.4 Process for Checking Ownership and Executing Tasks

As described previously, task descriptors need to be assigned to processing nodes 216 for execution in a uniform manner—such that the active processing nodes and processing groups are equally utilized. One way of achieving this is to compute the number of active processing nodes across all the processing groups and equally divide the number of tasks between the active processing nodes or equally divide the number of tasks amongst active processing groups and then within each group further subdivide the range equally. However, with this arrangement, a particular task will always be executed by the same processing group/node.

To avoid this, when round-robin execution of tasks is required, aspects of the present disclosure create time cycles for each task descriptor depending on the execution frequency of the task and then divide this time cycle equally between the number of active processing groups. For example, in case a particular task is scheduled to execute every 10 seconds and there are three active processing groups, the time cycle is calculated to be 30 seconds and each processing group is assigned a 10 second time window within that time cycle such that in the first ten seconds that task is executed by the first processing group, in the next ten seconds that task is executed by the second processing group and in the last ten seconds, that task is executed by the third processing group. The division of time cycles then continues in a similar manner for all subsequent executions of that task. In this manner, at any given time only one processing group is responsible for a task scheduled to be executed at a given time.

In addition to this time division, within each processing group, tasks are divided amongst the active processing nodes in a manner similar to that described with respect to the first embodiment—i.e., by creating allocation identifiers having values within a particular range of values and dividing that range of values amongst the active processing nodes in the group.

Accordingly, the task schedulers 218 of each processing node 216 is initially made aware of the total range of values within which each of the allocation identifiers may fall (e.g., 0-65535) and the hashing function required to create allocation identifiers.

Figure 8:
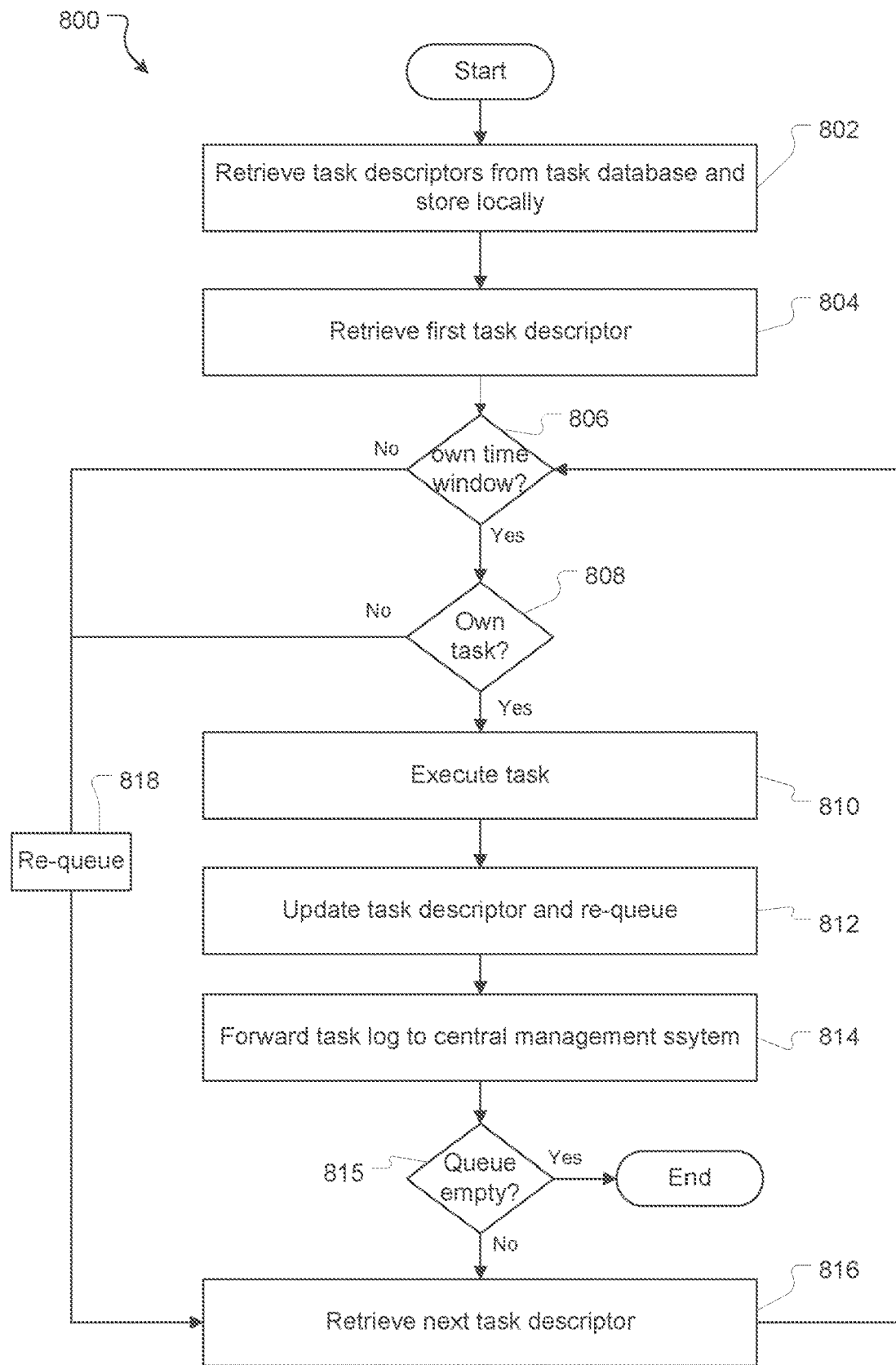
FIG. 8 is a flowchart illustrating a process for checking ownership and executing tasks at a particular processing node.

FIG. 8 is a flowchart illustrating an exemplary method 800 for checking ownership and executing tasks. In particular, method 800 is described with reference to a single processing node (e.g., processing node 216A) and its task scheduler (e.g., task scheduler 218A). However, it will be appreciated that all active processing nodes in the processor farm 208 may be configured to perform method 800 simultaneously.

The method commences at step 802, where the task scheduler 218A retrieves the task descriptors stored in the task database 206 and stores these locally in the processing node's memory. In case the task descriptors were maintained in an ordered queue in the task database 208, the task scheduler 218 may simply store the ordered queue. Alternatively, if the task descriptors were not previously ordered, the task scheduler may be configured to order the task descriptors, e.g., based on the test start time at this step.

Next, at step 804, the task scheduler 218A determines if a particular task is ready for execution (e.g., because the task's execution start time matches the current time) and retrieves the task descriptor for execution.

At step 806, the task scheduler 218A determines whether the task is assigned to the present processing node's group. To this end, the task scheduler 218 communicates with the membership database 220 to retrieve data related to active processing nodes and processing groups. In case the data is stored as illustrated in table D, the task scheduler 218 may retrieve table D, or a portion of the table (e.g., a predetermined number of data entries (e.g., 100) or data entries corresponding to a particular period in time (e.g. last 10 seconds)). Using basic computing functions such as filtering and deduplication, the data entries retrieved from the membership database 220 may be reduced to distinct processing groups to determine the number of active processing groups.

Using this information (i.e., the number of active processing groups and the frequency of execution of the current task descriptor), the task scheduler 218 determines the time cycle for the present task descriptor (i.e., no. of active processing groups*task execution frequency) and the number of time windows (i.e., no. of active processing groups) within the time cycle. Subsequently, the task scheduler's own time window is identified. In one embodiment, the time window may be identified by ordering the processing group identifiers in lexical order.

Once the time cycle and the task scheduler's own time windows are identified a determination is made whether the current time corresponds to the task scheduler's own time window or in other words whether the task scheduler 218 is part of the processing group that currently has ownership of task execution. In one embodiment, the task scheduler 218A may make this determination by first determining the absolute current time (e.g., by determining the Unix time stamp for the current time) and then computing a cycle offset. The cycle offset may be calculated by dividing the Unix time by the time cycle length (i.e., performing a modulo operation). The remainder of this calculation is the cycle offset. This cycle offset may be used to calculate the time cycle start time (e.g., by subtracting the cycle offset time from the current Unix time stamp). Using the time cycle start time and the time cycle offset a processing node can identify which time window aligns with the current time and whether that time window is assigned to its own processing node 216A. If it is determined that the current time corresponds to the task scheduler's own time window, it can be assumed that the task descriptor is assigned to the task scheduler's processing group and the method proceeds to step 808, where a determination is made whether the current task descriptor is assigned to the present processing node.

To make this determination, the task scheduler first calculates the range of allocation identifiers assigned to it and then determines whether the current task descriptor's allocation identifier falls within the assigned range. To calculate the range, the task scheduler 208 first identifies the number of active processing groups, e.g., by first filtering the data entries retrieved in step 806 to include entries corresponding to its own processing group and then de-duplicating those data entries based on processing node identifiers to obtain a list of active processing nodes in its own processing group.

A count of these processing nodes is the total number of active processing nodes in the present group.

The task scheduler 218 divides the arbitrary range of numbers (0-N) by this count of active processing nodes. This indicates the range of numbers that should be assigned to each processing node. Further, once the ranges are determined, the task scheduler identifies the particular range assigned to it. In one embodiment, this identification may be made based on a lexical ordering of the processing node identifiers of the active processing nodes.

Thereafter, in certain embodiments, the task scheduler 218A performs a hash function on the task identifier associated with the current task descriptor to convert the task identifier into an allocation identifier. If the converted hash value (i.e., the allocation identifier) falls within the range of allocation identifiers assigned to that processing node, the task scheduler 218 determines that the task is assigned to it and the method proceeds to step 810.

At step 810, the processing node 216A executes the task. For example, it may execute the test script and write the test output in a test log file.

At step 812, the task scheduler 218A updates the test start time for the task descriptor in its own memory and re-queues the task descriptor based on its next test start time at this step.

At step 814, the test log is forwarded to the task management system (which stored the test log in the task database 206 and updates the test start time for that task in the task database 206).

Subsequently, at step 815 a determination is made whether the task queue is empty—e.g., because all tasks are completed or the task queue has been erased. If a determination is made that the task queue is empty, the method 800 ends. Alternatively, if one or more task descriptors are still queued for execution in the queue, the method proceeds to step 816.

At step 816, the next task descriptor is retrieved from the queue for execution and the method proceeds to step 806. Steps 806-816 are repeated until all the test descriptors in the queue are executed. In most cases, as the task descriptors are re-queued, method steps 806-816 are repeated until the processing node terminates (e.g., because of network failure or automatically in response to lower demand).

Returning to step 806, if a determination is made that the current time is not within the processing node's 216A time window, the method proceeds to step 818 where the task descriptor is re-queued based on its next execution time. Further, if at step 810 a determination is made that the task is not assigned to the current processing node, e.g., because the computed allocation identifier does not fall within the range of numbers allocated to that processing node 216, the method proceeds to step 818 where the task descriptor is re-queued based on its next execution time. From step 818 the method proceeds to step 816 where the next task descriptor in the queue is retrieved for execution.

As noted previously, in addition to performing the steps of method 800, the task scheduler is configured to communicate with the membership database 220 regularly to announce its own existence (also referred to as checking-in in this disclosure). This communication may occur regularly in the background.

Further, it will be appreciated that although the step of retrieving membership information from the membership database 220 is shown as part of method 800, this step may be performed independently in a periodic manner.

Setting Task Execution Preferences

In certain embodiments, task requestors may be allowed to set task preferences e.g., to customize the processing groups that can execute the test. For example, in some cases a task requestor may want a synthetic test to be executed by one or more of the active processing groups in a sequential order—to check if the application responds in a similar fashion from different geographical locations. In other cases, a task requestor may want a synthetic test to be executed by one or more active processing groups simultaneously. In still other cases, a requestor may only be interested in reviewing test results for tests executed by a particular processing group—for example if an application to be tested is behind a firewall and can only be accessed by a processing group in a particular jurisdiction.

In such cases, the task requestor can indicate these execution preferences—i.e., whether test execution is required in a round-robin fashion (by two or more specific processing groups), in a simultaneous fashion (by two or more specific processing groups) or by a single specific processing group. In some embodiments, this execution preference may be forwarded to the test management system 204 along with the task request (e.g., as a field in the task request). The test management system 204 in turn may include this information in the task descriptor when the task descriptor is created.

Accordingly, in such embodiments, at method step 806, the task scheduler 218A is further configured to retrieve the execution preference for the particular task from the task descriptor and determine whether it should perform the test based on the execution preferences. For instance, if the preference indicates that the test is meant to be executed by one or more particular processing groups simultaneously, the task scheduler determines whether the identifier of the specified processing group matches its own processing group identifier. If there is a match, the method proceeds to step 810. Otherwise, (i.e., if the processing group identifiers do not match) the task can be discarded and the method can proceed to step 816.

On the other hand, if the execution preference indicates sequential execution by two or more processing groups and the task scheduler determines that the identifiers of the processing groups mentioned in the execution preferences field matches its own processing group identifier, the task scheduler 218 may be configured to directly compute the time cycle and time window for the task based on the number of processing groups mentioned in the execution preferences and determine its own time window based on the identifiers of the processing groups mentioned in the execution preferences field.

If the execution preference indicates round robin execution by all active processing groups, method 800 is performed.

3.5 Offsetting Task Execution Times

Figure 9:
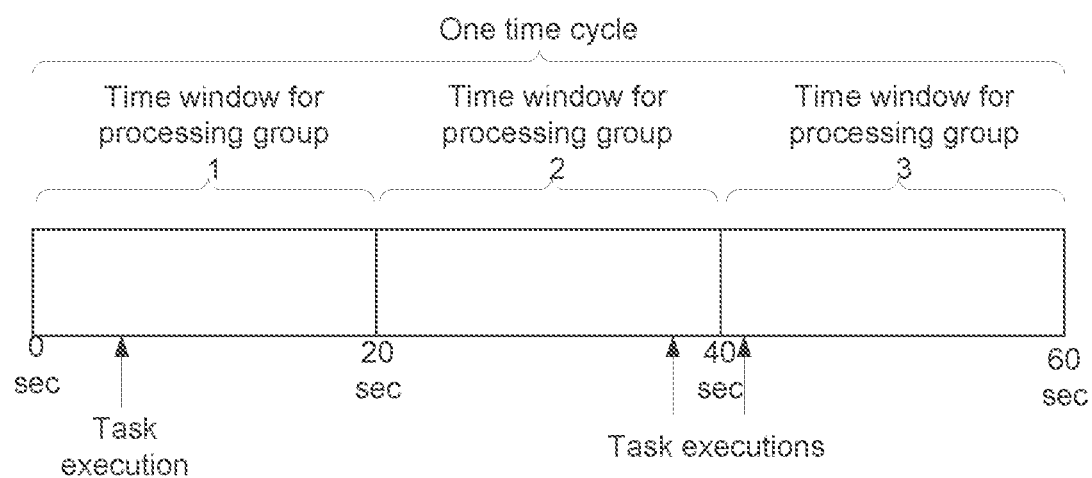
FIG. 9 illustrates an example task being executed by three processing groups without task execution offset.

If a particular task is supposed to be executed every 20 seconds, and there are three processing groups sharing a 60 second cycle, ideally each processing group executes that particular task in its own time window and the task gets executed by all three processing groups in turn. Sometimes, however, one processing group may execute the task at the 6 second mark in its time window, the second processing group may execute the task at the 15 second mark in its time window whereas the third processing group may execute that task at the 1 second mark in its time window. This situation is illustrated in FIG. 9. As seen in FIG. 9, this may lead that particular task to be executed two times in a duration of six seconds (see difference between the second and third processing group execution times) as opposed to being executed twice 20 seconds apart. The processing groups may execute the same task at different times in their time windows depending on the number of tasks that have the same task execution time in their buffering queue and the particular order of these tasks in their respective queues.

To prevent this from happening, the presently disclosed task schedulers 218 offset task execution times within each time window such that the task is executed at approximately the same time in each time window and by each processing group. In certain embodiments, a task execution offset may be computed for each task as a function of its task identifier and task execution interval. For example, a modulo function may be applied on the task identifier and task execution interval (e.g., task identifier mod task execution interval) to compute the task execution offset for a particular task descriptor.

Each task scheduler 218 may perform a similar function on its task descriptors to compute the task execution offsets. In certain embodiments the execution time offsets may be calculated for each task descriptor when the task descriptor is retrieved from the task management system 204. In other embodiments, the execution time offsets may be computed periodically for task descriptors scheduled for execution in the corresponding period. The calculated execution offsets may be stored in the task descriptors and the corresponding task descriptors may be queued for execution based on these calculated execution offsets.

Figure 10:
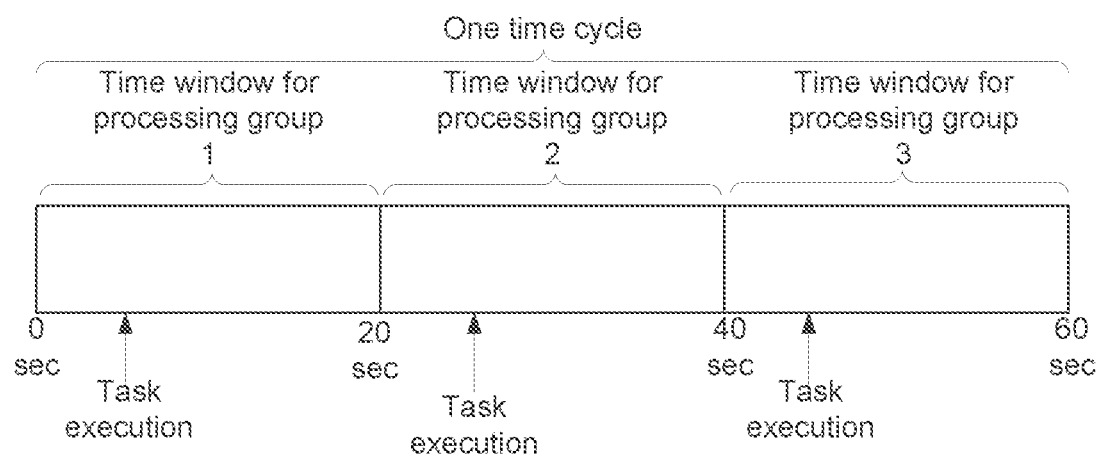
FIG. 10 illustrates an example task being executed by three processing groups with task execution offset.

FIG. 10 illustrates an example task descriptor being executed by three processing groups with execution offset. As seen in this figure, the task descriptor is executed or picked up for execution at about the same time in each processing group.

3.6 Task Scheduling Amongst Processing Nodes: Embodiments

Example embodiments relevant to task scheduling amongst multiple processing groups are set out in the following numbered clauses:

Clause 1: A method for scheduling tasks, the method comprising: at a task scheduler of a processing node, the processing node being a part of a processing group of a plurality of processing groups: retrieving a first task descriptor from a local memory, the task descriptor corresponding to a task scheduled for execution at the current time and comprising at least a task execution time, a frequency for performing the task, and a task identifier; determining whether the task descriptor is assigned to the processing group associated with the task scheduler for execution; if it is determined that the task descriptor is assigned to the processing group associated with the task scheduler for execution: determining whether the task descriptor is assigned to the task scheduler for execution; if it is determined that the task descriptor is assigned to task scheduler for execution: executing the task; updating the task execution time based on the current task execution time and the frequency for performing the task; and re-queuing the task descriptor in the local memory.

Clause 2: The method of clause 1, wherein determining whether the task descriptor is assigned to the processing group for execution comprises: determining the number of active processing groups; determining a time window of a time cycle assigned to the processing group based at least in part on the number of active processing groups and the frequency for performing the task; determining whether the current time is within the time window assigned to the processing group.

Clause 3: The method of clause 2, wherein determining whether the task descriptor is assigned to the processing group for execution further comprises: determining that the task descriptor is assigned to the processing group if the current time is within the time window assigned to the processing group; and determining that the task descriptor is not assigned to the processing group if the allocation identifier is not within the range of allocation identifiers assigned to the processing node.

Clause 4: The method of clause 2, wherein if it is determined that the task descriptor is not assigned to the processing group for execution, the method further comprising: updating the task execution time based on the current task execution time and the frequency for performing the task; and re-queuing the task descriptor in the local memory.

Clause 5: The method of clause 1, wherein determining whether the task descriptor is assigned to the task scheduler for execution comprises: determining the number of active processing nodes; determining a range of allocation identifiers assigned to the processing node based at least in part on the number of active processing nodes; converting the task identifier into an allocation identifier; determining whether the allocation identifier is within the range of allocation identifiers assigned to the processing node.

Clause 6: The method of clause 5, wherein determining a range of allocation identifiers assigned to the processing node is further based on a precedence ordering of the active processing nodes.

Clause 7: The method of clause 5, wherein determining whether the task descriptor is assigned to the task scheduler for execution further comprises: determining that the task descriptor is assigned to the task scheduler if the allocation identifier is within the range of allocation identifiers assigned to the processing node; and determining that the task descriptor is not assigned to the task scheduler if the allocation identifier is not within the range of allocation identifiers assigned to the processing node.

Clause 8: The method of clause 5, wherein if it is determined that the task descriptor is not assigned to the task scheduler for execution, the method further comprising: updating the task execution time based on the current task execution time and the frequency for performing the task; and re-queuing the task descriptor in the local memory Clause 9: The method of clause 5, wherein determining the number of active processing nodes further comprises: retrieving from an external database a list of entries, each entry corresponding to a processing node announcing its existence to the external database and comprising at least a processing node identifier, and a time stamp of the time of the announcement; and filtering the list of entries to one or more distinct processing node identifiers, wherein each distinct processing node identifier corresponding to an active processing node.

Clause 10: The method of clause 2, wherein determining the number of active processing groups further comprises: retrieving from an external database a list of entries, each entry corresponding to a processing node announcing its existence to the external database and comprising at least a processing node identifier, a corresponding processing group identifier, and a time stamp of the time of the announcement; and filtering the list of entries to one or more distinct processing group identifiers, wherein each distinct processing group identifier corresponding to an active processing group.

Clause 11: The method of clause 9 or 10, further comprising: filtering the retrieved list of entries to entries corresponding to announcements made in a predetermined time period.

Clause 12: The method of clause 1, further comprising: periodically announcing the existence of the processing node to an external database, the announcement comprising an identifier of the processing node, an identifier of the corresponding processing group, and a timestamp indicating the time of the announcement.

Clause 13: The method of clause 2, further comprising: determining whether the number of active processing groups has changed; in response to determining the number of active processing groups has changed, recalculating the time window assigned to the processing group based at least in part on the number of active processing groups and the frequency for performing the task.

Clause 14: The method of clause 5, further comprising: determining whether the number of active processing nodes has changed; in response to determining the number of active processing nodes has changed, recalculating the range of allocation identifiers assigned to the processing node based at least in part on the number of active processing nodes.

Clause 15: A task scheduler of a processing node, the processing node being a part of a processing group of a plurality of processing groups, the task scheduler configured to: retrieve a first task descriptor from a local memory of the task scheduler, the task descriptor corresponding to a task scheduled for execution at the current time and comprising at least a task execution time, a frequency for performing the task, and a task identifier; determine whether the task descriptor is assigned to the processing group associated with the task scheduler for execution; if it is determined that the task descriptor is assigned to the processing group associated with the task scheduler for execution: determine whether the task descriptor is assigned to the task scheduler for execution; if it is determined that the task descriptor is assigned to task scheduler for execution: execute the task; update the task execution time based on the current task execution time and the frequency for performing the task; and re-queue the task descriptor in the local memory.

Clause 16: The task scheduler of clause 15, wherein to determine whether the task descriptor is assigned to the processing group for execution, the task scheduler is further configured to: determine the number of active processing groups; calculating a time window of a time cycle assigned to the processing group based at least in part on the number of active processing groups and the frequency for performing the task; and determine whether the current time is within the time window assigned to the processing group.

Clause 17: The task scheduler of clause 16, wherein to determine whether the task descriptor is assigned to the processing group for execution, the task scheduler is further configured to: determine that the task descriptor is assigned to the processing group if the current time is within the time window assigned to the processing group; and determine that the task descriptor is not assigned to the processing group if the allocation identifier is not within the range of allocation identifiers assigned to the processing node.

Clause 18: The task scheduler of clause 16, wherein if it is determined that the task descriptor is not assigned to the processing group for execution, the task scheduler is further configured to: update the task execution time based on the current task execution time and the frequency for performing the task; and re-queuing the task descriptor in the local memory.

Clause 19: The task scheduler of clause 16, wherein to determine whether the task descriptor is assigned to the task scheduler for execution, the task scheduler is further configured to: determine the number of active processing nodes; calculate a range of allocation identifiers assigned to the processing node based at least in part on the number of active processing nodes; convert the task identifier into an allocation identifier; and determine whether the allocation identifier is within the range of allocation identifiers assigned to the processing node.

Clause 20: The task scheduler of clause 19, wherein to determine whether the task descriptor is assigned to the task scheduler the task scheduler is further configured to: determine that the task descriptor is assigned to the task scheduler if the allocation identifier is within the range of allocation identifiers assigned to the processing node; and determine that the task descriptor is not assigned to the task scheduler if the allocation identifier is not within the range of allocation identifiers assigned to the processing node.

Clause 21: The task scheduler of clause 20, wherein determining a range of allocation identifiers assigned to the processing node is further based on a precedence ordering of the active processing nodes.

Clause 22: The task scheduler of clause 20, wherein if it is determined that the task descriptor is not assigned to the task scheduler for execution, the task scheduler is further configured to: update the task execution time based on the current task execution time and the frequency for performing the task; and re-queue the task descriptor in the local memory.

Clause 23: The task scheduler of clause 19, wherein to determine the number of active processing nodes the task scheduler is further configured to: retrieve from an external database a list of entries, each entry corresponding to a processing node announcing its existence to the external database and comprising at least a processing node identifier, and a time stamp of the time of the announcement; and filter the list of entries to one or more distinct processing node identifiers, wherein each distinct processing node identifier corresponding to an active processing node.

Clause 24: The task scheduler of clause 16, wherein to determine the number of active processing groups the task scheduler is further configured to: retrieve from an external database a list of entries, each entry corresponding to a processing node announcing its existence to the external database and comprising at least a processing node identifier, a corresponding processing group identifier, and a time stamp of the time of the announcement; and filter the list of entries to one or more distinct processing group identifiers, wherein each distinct processing group identifier corresponding to an active processing group.

Clause 25: The task scheduler of clause 23 or 24, further configured to: filter the retrieved list of entries to entries corresponding to announcements made in a predetermined time period.

Clause 26: The task scheduler of clause 15, further configured to: periodically announce the existence of the processing node to an external database, the announcement comprising an identifier of the processing node, an identifier of the corresponding processing group, and a timestamp indicating the time of the announcement.

Clause 27: The task scheduler of clause 16, further configured to: determine whether the number of active processing groups has changed; in response to determining the number of active processing groups has changed, recalculate the time window assigned to the processing group based at least in part on the number of active processing groups and the frequency for performing the task.

Clause 28: The task scheduler of clause 19, further configured to: determine whether the number of active processing nodes has changed; in response to determining the number of active processing nodes has changed, recalculate the range of allocation identifiers assigned to the processing node based at least in part on the number of active processing nodes.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using process steps. The functionality/processing of a given process step could potentially be performed in various different ways and by various different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extends to alternative combinations of two or more of the individual features mentioned or evident from the text or drawings. These different combinations constitute various alternative aspects of the embodiments.

What is claimed is:

1. A method for scheduling tasks, the method comprising:
at a task scheduler of a processing node of a plurality of processing nodes:
retrieving a task descriptor from a local memory of the task scheduler, the task descriptor corresponding to a task scheduled for execution at a current time and comprising at least a task execution time, a frequency for performing the task, and a task identifier;
determining a number of active processing nodes of the plurality of processing nodes, each processing node of the plurality of processing nodes associated with a distinct task scheduler;
determining a range of allocation identifiers assigned to the processing node based at least in part on the number of active processing nodes;
converting the task identifier into an allocation identifier;
determining whether the allocation identifier is within the range of allocation identifiers assigned to the processing node;
in response to determining that the allocation identifier is within the range of allocation identifiers assigned to the processing node:
executing the task;
updating the task execution time based on the frequency for performing the task; and
re-queuing the task descriptor in the local memory;
determining whether the number of active processing nodes has changed; and
in response to determining the number of active processing nodes has changed, recalculating the range of allocation identifiers assigned to the processing node based at least in part on the number of active processing nodes.

2. The method of claim 1, wherein determining the range of allocation identifiers assigned to the processing node is additionally based on a precedence ordering of the number of active processing nodes.

3. The method of claim 1, further comprising determining whether the task descriptor is assigned to the task scheduler for execution by:
determining that the task descriptor is assigned to the task scheduler in response to determining that the allocation identifier is within the range of allocation identifiers assigned to the processing node; and
determining that the task descriptor is not assigned to the task scheduler in response to determining that the allocation identifier is not within the range of allocation identifiers assigned to the processing node.

4. The method of claim 3, further comprising, in response to determining that the task descriptor is not assigned to the task scheduler for execution:
updating the task execution time based on the frequency for performing the task; and
re-queuing the task descriptor in the local memory.

5. The method of claim 1, wherein determining the number of active processing nodes comprises:
retrieving, from an external database, a list of entries, each entry of the list of entries corresponding to at least one processing node and comprising at least a processing node identifier and a time stamp; and
filtering the list of entries to one or more distinct processing node identifiers, wherein:
each distinct processing node identifier corresponds to an active processing node of the number of active processing nodes;
the at least one processing node announces its existence to the external database; and
the time stamp corresponds to a time of the announcement.

6. The method of claim 5, wherein determining the number of active processing nodes further comprises filtering the list of entries to announcements made in a predetermined time period.

7. The method of claim 1, further comprising periodically announcing an existence of the processing node to an external database, the announcement comprising a processing node identifier of the processing node and a timestamp indicating a time of the announcement.

8. A task scheduler for scheduling tasks, the task scheduler operating on a processing node of a plurality of processing nodes, each processing node of the plurality of processing nodes including a distinct task scheduler, the task scheduler configured to:
retrieve a task descriptor from a local memory, the task descriptor corresponding to a task scheduled for execution at a current time and comprising at least a task execution time, a frequency for performing the task, and a task identifier;
determine a number of active processing nodes of the plurality of processing nodes, each processing node of the plurality of processing nodes associated with the distinct task scheduler;

determine a range of allocation identifiers assigned to the processing node based at least in part on the number of active processing nodes;
convert the task identifier into an allocation identifier;
determine whether the allocation identifier is within the range of allocation identifiers assigned to the processing node;
in response to determining that the allocation identifier is within the range of allocation identifiers assigned to the processing node:
  execute the task;
  update the task execution time based on the frequency for performing the task; and
  re-queue the task descriptor in the local memory;
determine whether the number of active processing nodes has changed; and
in response to determining the number of active processing nodes has changed, recalculate the range of allocation identifiers assigned to the processing node based at least in part on the number of active processing nodes.

9. The task scheduler of claim 8, wherein determining the range of allocation identifiers assigned to the processing node is additionally based on a precedence ordering of the number of active processing nodes.

10. The task scheduler of claim 8, further configured to:
determine whether the task descriptor is assigned to the task scheduler:
  in response to determining that the allocation identifier is within the range of allocation identifiers assigned to the processing node, determine that the task descriptor is assigned to the task scheduler; and
  in response to determining that the allocation identifier is not within the range of allocation identifiers assigned to the processing node, determine that the task descriptor is not assigned to the task scheduler.

11. The task scheduler of claim 10, wherein, in response to determining that the task descriptor is not assigned to the task scheduler for execution, the task scheduler is further configured to:
update the task execution time based on the frequency for performing the task; and
re-queue the task descriptor in the local memory.

12. The task scheduler of claim 8, wherein, to determine the number of active processing nodes, the task scheduler is further configured to:
retrieve, from an external database, a list of entries, each entry of the list of entries corresponding to at least one processing node and comprising at least a processing node identifier and a time stamp; and
filter the list of entries to one or more distinct processing node identifiers, wherein:
  each distinct processing node identifier corresponds to an active processing node of the number of active processing nodes;
  the at least one processing node announces its existence to the external database; and
  the time stamp corresponds to a time of the announcement.

13. The task scheduler of claim 12, further configured to filter the list of entries to announcements made in a predetermined time period.

14. The task scheduler of claim 8, further configured to periodically announce an existence of the processing node to an external database, the announcement comprising a processing node identifier of the processing node and a timestamp indicating a time of the announcement.

* * * * *